US009690648B2

(12) United States Patent
Lewis

(10) Patent No.: US 9,690,648 B2
(45) Date of Patent: Jun. 27, 2017

(54) AT-RISK SYSTEM REPORTS DELIVERY AT SITE

(71) Applicant: NETAPP, INC., Sunnyvale, CA (US)

(72) Inventor: Leita Bach Lewis, Raleigh, NC (US)

(73) Assignee: NETAPP, INC., Sunnyvale, CA (US)

(*) Notice: Subject to any disclaimer, the term of this patent is extended or adjusted under 35 U.S.C. 154(b) by 41 days.

(21) Appl. No.: 14/928,403

(22) Filed: Oct. 30, 2015

(65) Prior Publication Data

US 2017/0123874 A1    May 4, 2017

(51) Int. Cl.
*G06F 11/07* (2006.01)
*G06F 11/00* (2006.01)

(52) U.S. Cl.
CPC .......... *G06F 11/079* (2013.01); *G06F 11/008* (2013.01); *G06F 11/0751* (2013.01); *G06F 11/0772* (2013.01)

(58) Field of Classification Search
CPC ........................... G06F 11/008; G06F 11/2257
USPC ...................................................... 714/26, 37
See application file for complete search history.

(56) References Cited

U.S. PATENT DOCUMENTS

| | | | | | |
|---|---|---|---|---|---|
| 2002/0007468 | A1* | 1/2002 | Kampe | ............... | H04L 12/2602 714/4.12 |
| 2002/0163910 | A1* | 11/2002 | Wisner | ............... | H04L 41/0681 370/389 |
| 2002/0190868 | A1* | 12/2002 | Dearborn | ............. | G06F 11/326 340/691.1 |
| 2009/0119035 | A1* | 5/2009 | Younsi | ................ | G01R 31/343 702/58 |
| 2009/0178046 | A1* | 7/2009 | Jain | ....................... | G06F 9/5005 718/104 |
| 2011/0022882 | A1* | 1/2011 | Jaehde | ............... | G06F 11/2023 714/4.1 |
| 2011/0040719 | A1* | 2/2011 | Aguilar | ............... | G05B 23/024 706/52 |
| 2011/0178831 | A1* | 7/2011 | Ravichandran | ........ | G06Q 10/06 705/7.11 |
| 2012/0005532 | A1* | 1/2012 | Li | ...................... | G06F 11/0709 714/26 |
| 2012/0110584 | A1* | 5/2012 | Chaudhry | ............ | G06F 9/5027 718/102 |
| 2013/0041705 | A1* | 2/2013 | Hampapur | ............ | G06Q 10/10 705/7.12 |
| 2013/0212440 | A1* | 8/2013 | Rom | .................. | G06F 11/0709 714/47.1 |
| 2014/0019813 | A1* | 1/2014 | McLean | ........... | G06F 17/30575 714/47.3 |
| 2014/0214447 | A1* | 7/2014 | Brooker | ................. | G06F 17/30 705/2 |

(Continued)

*Primary Examiner* — Chae Ko
(74) *Attorney, Agent, or Firm* — Klein, O'Neill & Singh, LLP

(57) ABSTRACT

The present application describes techniques for providing dynamic at-risk system reports at the site of the at-risk system. The ARS may send information about system health (e.g., values for system health parameters) to a support entity, and may receive a risk assessment from the support entity. The ARS may, alternatively or in addition, receive support information from the support entity. Risk assessments and recommendations may be surfaced on a user interface of the ARS. New risk profiles, risk assessments, and support recommendations may be developed and loaded onto the support entity to provide dynamically updatable support solutions.

20 Claims, 10 Drawing Sheets

(56) References Cited

U.S. PATENT DOCUMENTS

| | | | |
|---|---|---|---|
| 2014/0317446 A1* | 10/2014 | Best | G06F 11/2082 |
| | | | 714/6.23 |
| 2015/0067153 A1* | 3/2015 | Bhattacharyya | H04L 43/04 |
| | | | 709/224 |
| 2015/0149835 A1* | 5/2015 | Jayaraman | G06F 11/008 |
| | | | 714/48 |
| 2015/0331774 A1* | 11/2015 | Slik | G06F 3/06 |
| | | | 714/6.23 |

* cited by examiner

AT-RISK SYSTEM REPORTS DELIVERY AT SITE

BACKGROUND

A computing environment may be made up of one or more computing systems. Such systems may be capable of failure for a number of reasons. Such a system is referred to herein as an at-risk system ("ARS"). It may be important to measure the health of ARSes and assess the risk of a system failure. The present application is addressed to the problem of assessing the health of an ARS efficiently, in a manner that allows for new risks to be dynamically identified and that provides risk information directly where it is needed.

DETAILED DESCRIPTION

Figure 1:
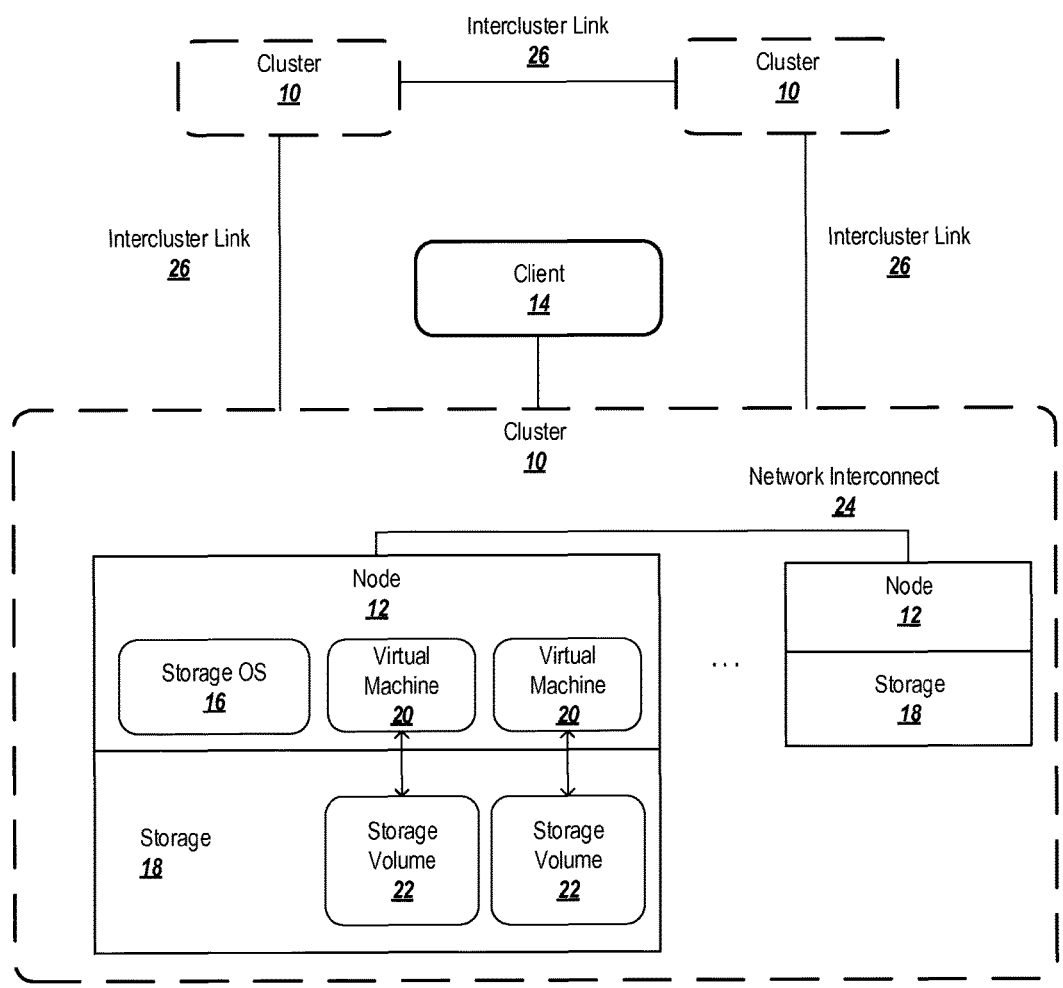
FIG. 1 depicts an exemplary cluster hosting virtual machines.

The present application describes techniques for providing dynamic at-risk system reports at the site of the at-risk system. The ARS may send information about system health (e.g., values for system health parameters) to a support entity, and may receive a risk assessment from the support entity. The ARS may, alternatively or in addition, receive support information from the support entity. Risk assessments and recommendations may be surfaced on a user interface of the ARS. New risk profiles, risk assessments, and support recommendations may be developed and loaded onto the support entity to provide dynamically updatable support solutions.

Exemplary embodiments relate to the automated detection of systems at risk of failure based on diagnostic data. As noted above, assessing the risk of a system failure is an important issue, particularly when the at-risk system ("ARS") represents a shared or critical piece of infrastructure.

One possible solution to the problem of assessing failure risk is to assess ARS health data locally at the ARS. This can be problematic, however, because such a solution is static. The ARS is limited to the risk profiles and solutions that are preprogrammed into the device. Updating these risk profiles and solutions typically requires a software update, which may involve taking the device offline for a period of time. Moreover, hardware limitations of the ARS may limit the number of risk profiles and possible solutions that can be stored locally.

Another potential option is to run system diagnostics remotely (for example, at a support server). In such a case, the ARS may send health data to the support server, and a user of the ARS may log in to the support server to review the support server's assessment of the ARS and any recommendations for mitigating a risk of system failure. For example, the user might access the support server through a website or portal to view diagnostics and recommendations.

This solution, however, also carries drawbacks. The user may need log into the ARS server and view the diagnostic information through separate software (e.g., a web browser) which is different than the software with which the user typically interacts on the ARS. For example, if the user interacts with the ARS through a command interface or prompt, retrieving risk assessments through a web browser may take the user out of their workflow, and may necessitate the use of additional system resources to provide the web browser.

Still further, retrieving information from a support site is an active process that the user must manually perform. Because many users will wait until a problem is readily apparent before retrieving diagnostic information, the users may miss out on the opportunity to take early, preventative action at a time when the symptoms of a problem first arise.

According to exemplary embodiments, risk assessments and recommendations are surfaced on the at-risk system ("ARS") interface. The ARS provides health data to a support entity, which may specify the kind of health data that the ARS should provide. Because the health data is analyzed at the support entity, and because the support entity can direct what kinds of data are acquired, risk profiles, assessments, and recommendations can be dynamically updated at the support entity and applied dynamically in real-time as new information about system risk becomes available.

The support entity may push risk assessments to the ARS, so that risk assessments are made available as they are generated. The ARS may display information about the risk assessment or recommendations in the ARS's native interface, without the need for the user to manually retrieve the assessment or recommendations and without the need to display the assessment and recommendations in a separate interface element such as a web browser.

As a result, a user can use local software executing on the filer to access diagnostic information and recommendations, without the need to access support servers directly, and without the need to manually perform a risk assessment.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

As used herein, the identifiers "a" and "b" and "c" and similar designators are intended to be variables representing any positive integer. Thus, for example, if an implementation sets a value for a=5, then a complete set of components 122-*a* may include components 122-1, 122-2, 122-3, 122-4 and 122-5. The embodiments are not limited in this context.

System Overview

FIGS. 1A and 1B depict suitable environments in which an at-risk system monitor may be employed.

FIG. 1A depicts an example of a cluster 10 suitable for use with exemplary embodiments. A cluster 10 represents a logical collection of one or more nodes 12 that perform services, such as data storage or processing, on behalf of one or more clients 14.

In some embodiments, the nodes 12 may be special-purpose controllers, such as fabric-attached storage (FAS) or network-attached storage (NAS) controllers, optimized to run a storage operating system 16 and manage one or more attached storage devices 18. The nodes 12 provide network ports that clients 14 may use to access the storage 18. The storage 18 may include one or more drive bays for hard disk drives (HDDs), flash storage, a combination of HDDs and flash storage, and other non-transitory computer-readable storage mediums. In some embodiments, the nodes 12 may represent general-purpose devices and/or may run a general-purpose operating system. The nodes 12 may also be referred to as "filers."

The storage operating system 16 may be an operating system configured to receive requests to read and/or write data to one of the storage devices 18 of the cluster 10, to perform load balancing and assign the data to a particular storage device 18, and to perform read and/or write operations (among other capabilities). The storage operating system 16 serves as the basis for virtualized shared storage infrastructures, and may allow for nondisruptive operations, storage and operational efficiency, and scalability over the lifetime of the system. One example of a storage operating system 16 is the Clustered Data ONTAP® operating system of NetApp, Inc. of Sunnyvale, Calif.

The nodes 12 may be connected to each other using a network interconnect 24. One example of a network interconnect 24 is a dedicated, redundant 10-gigabit Ethernet interconnect. The interconnect 24 allows the nodes 12 to act as a single entity in the form of the cluster 10.

A cluster 10 provides hardware resources, but clients 14 may access the storage 18 in the cluster 10 through one or more storage virtual machines (SVMs) 20. SVMs 20 may exist natively inside the cluster 10. The SVMs 20 define the storage available to the clients 14. SVMs 20 define authentication, network access to the storage in the form of logical interfaces (LIFs), and the storage itself in the form of storage area network (SAN) logical unit numbers (LUNs) or network attached storage (NAS) volumes.

SVMs 20 store data for clients 14 in flexible storage volumes 22. Storage volumes 22 are logical containers that contain data used by applications, which can include NAS data or SAN LUNs. The different storage volumes 22 may represent distinct physical drives (e.g., different HDDs) and/or may represent portions of physical drives, such that more than one SVM 20 may share space on a single physical drive.

Clients 14 may be aware of SVMs 20, but they may be unaware of the underlying cluster 10. The cluster 10 provides the physical resources the SVMs 20 need in order to serve data. The clients 14 connect to an SVM 20, rather than to a physical storage array in the storage 18. For example, clients 14 require IP addresses, World Wide Port Names (WWPNs), NAS volumes, SMB (CIFS) shares, NFS exports, and LUNs. SVMs 20 define these client-facing entities, and use the hardware of the cluster 10 to deliver the storage services. An SVM 20 is what users connect to when they access data.

Connectivity to SVMs 20 is provided through logical interfaces (LIFs). A LIF has an IP address or World Wide Port Name used by a client or host to connect to an SVM 20. A LIF is hosted on a physical port. An SVM 20 can have LIFs on any cluster node 12. Clients 14 can access data regardless of the physical location of the data in the cluster 10. The cluster 10 will use its interconnect 24 to route traffic to the appropriate location regardless of where the request arrives. LIFs virtualize IP addresses or WWPNs, rather than permanently mapping IP addresses and WWPNs to NIC and HBA ports. Each SVM 20 may use its own dedicated set of LIFs.

Thus, like compute virtual machines, SVMs 20 decouple services from hardware. Unlike compute virtual machines, a single SVM 20 can use the network ports and storage of many nodes 12, enabling scale-out. One node's 12 physical network ports and physical storage 18 also can be shared by many SVMs 20, enabling multi-tenancy.

A single cluster 10 can contain multiple SVMs 20 targeted for various use cases, including server and desktop virtualization, large NAS content repositories, general-purpose file services, and enterprise applications. SVMs 20 can also be used to separate different organizational departments or tenants. The components of an SVM 20 are not permanently tied to any specific piece of hardware in the cluster 10. An SVM's volumes 22, LUNs, and logical interfaces can move to different physical locations inside the cluster 10 while maintaining the same logical location to clients 14. While physical storage and network access moves to a new location inside the cluster 10, clients 14 can continue accessing data in those volumes or LUNs, using those logical interfaces.

This capability allows a cluster 10 to continue serving data as physical nodes 12 are added or removed from the cluster 10. It also enables workload rebalancing and native, nondisruptive migration of storage services to different media types, such as flash, spinning media, or hybrid configurations. The separation of physical hardware from storage services allows storage services to continue as all the physical components of a cluster are incrementally replaced. Each SVM 20 can have its own authentication, its own storage, its own network segments, its own users, and its own administrators. A single SVM 20 can use storage 18 or network connectivity on any cluster node 12, enabling scale-out. New SVMs 20 can be provisioned on demand, without deploying additional hardware.

One capability that may be provided by a storage OS 16 is storage volume snapshotting. When a snapshot copy of a volume 22 is taken, a read-only copy of the data in the volume 22 at that point in time is created. That means that application administrators can restore LUNs using the snapshot copy, and end users can restore their own files.

Snapshot copies are high-performance copies. When writes are made to a flexible volume 22 that has an older snapshot copy, the new writes are made to free space on the underlying storage 18. This means that the old contents do not have to be moved to a new location. The old contents stay in place, which means the system continues to perform quickly, even if there are many Snapshot copies on the system. Volumes 22 can thus be mirrored, archived, or nondisruptively moved to other aggregates.

Therefore, snapshotting allows clients 14 to continue accessing data as that data is moved to other cluster nodes. A cluster 10 may to continue serving data as physical nodes 12 are added or removed from it. It also enables workload rebalancing and nondisruptive migration of storage services to different media types. No matter where a volume 22 goes, it keeps its identity. That means that its snapshot copies, its replication relationships, its deduplication, and other characteristics of the flexible volume remain the same.

The storage operating system 16 may utilize VM-agnostic or VM-independent formatting, destination paths, and configuration options for storing data objects in the storage devices 18. For example, Clustered Data ONTAP® uses the NetApp WAFL® (Write Anywhere File Layout) system, which delivers storage and operational efficiency technologies such as fast, storage-efficient copies; thin provisioning; volume, LUN, and file cloning; deduplication; and compression. WAFL® accelerates write operations using nonvolatile memory inside the storage controller, in conjunction with optimized file layout on the underlying storage media. Clustered Data ONTAP® offers integration with hypervisors such as VMware ESX® and Microsoft® Hyper-V®. Most of the same features are available regardless of the protocol in use.

Although the data objects stored in each VM's storage volume 22 may be exposed to the client 14 according to VM-specific formatting and path settings, the underlying data may be represented according to the storage operating system's VM-agnostic configuration.

Management of the cluster 10 is often performed through a management network. Cluster management traffic can be placed on a separate physical network to provide increased security. Together, the nodes 12 in the cluster 10, their client-facing network ports (which can reside in different network segments), and their attached storage 18 form a single resource pool.

According to exemplary embodiments, one or more nodes 12 may undergo system health assessments performed by a separate support entity communicatively coupled to the node 12. The node 12 in this example is considered to be an ARS.

It is noted that, although exemplary embodiments described above includes nodes 12 that form part of a cluster, one of ordinary skill in the art will recognize that the present invention is not so limited. Rather, the invention may be applied in any suitable environment using a node and a distinct support entity.

Figure 2:
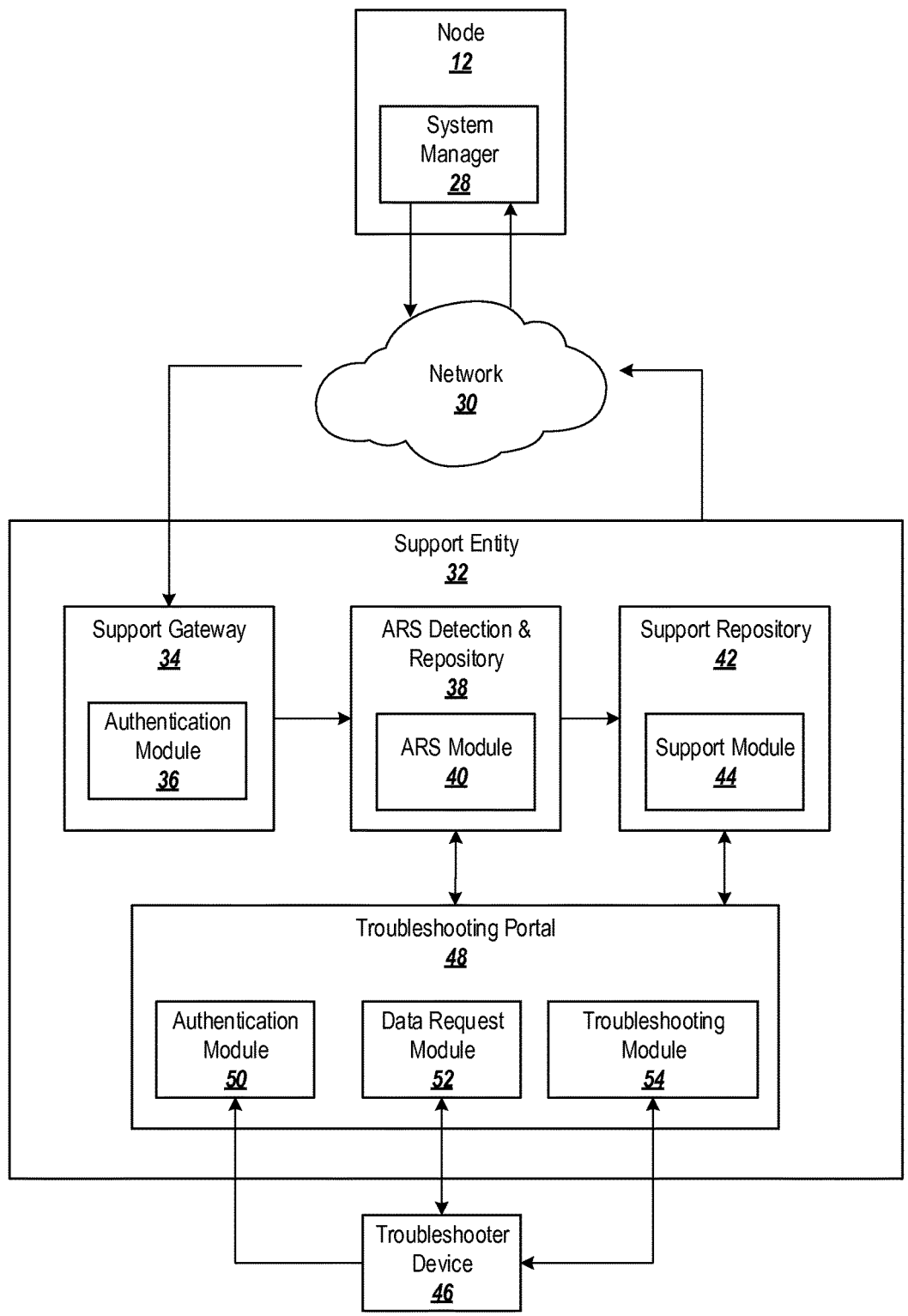
FIG. 2 depicts an exemplary support system suitable for use with exemplary embodiments.

FIG. 2 depicts an example of a node 12 connected to a support entity 32 through a network 30. The node 12 includes a system manager 28 having an interface for displaying information on a display. A user may interact with the interface of the system manager 28 in order to provide or configure services on the node 12.

The network 30 may be any suitable type of network, including a wired or wireless network. The network 30 passes messages between the node 12 and the support entity 32 for, among other things, performing system health analyses and risk assessments.

To achieve this purpose, the system manager 28 may use a communications device to forward system health information in the form of values for system status parameters to a support gateway 34 on the support entity. The support gateway 34 may receive messages on a communications device and perform authentication and authorization checks via an authentication module 36. The authentication module 36 may, for example, verify the source of the system health data, ensure that the node 12 is authorized to use the services of the support entity, etc. The authentication module 36, and other modules described herein, may be in the form of computer readable instructions stored on a non-transitory computer readable medium.

The support gateway 34 may also be configured to receive network traffic in the form of messages, and forward the messages to an appropriate entity within the support entity. For example, the system manager 28 of the node 12 may transmit system diagnostic information. The diagnostic information may include any parameters that, depending on their value, could be indicative of a failure of the node 12 or one of the components of the node.

The support gateway 34 may send the diagnostic information to an ARS Detection and Repository system 38. The ARS Detection and Repository system 38 may include a database including diagnostic information for each of the nodes 12 serviced by the support entity 32 (of which there may be several). Upon receiving the diagnostic information from the support gateway 34, the ARS Detection and Repository system 38 may store the diagnostic information in the repository.

The repository may also store one or more rules that may be applied in a risk assessment. The ARS Detection and Repository system 38 may also be associated with an ARS module 40, which analyzes the information in the repository and performs the risk assessment by applying the rules.

Based on the analysis performed by the ARS module 40, a risk assessment may be generated. The risk assessment may be sent to a support repository 42, which includes recommendations and solution data that may be used to address any problems flagged by the ARS module 40. The support repository 42 may be provided with a support module 44 for analyzing the risk assessment in view of the information available in the support repository (e.g., by applying one or more predefined rules to the risk assessment), and for selecting one or more recommendations or solutions. The selected recommendations or solutions may be transmitted, along with the risk assessment, through the network 30 to the system manager 28 of the node 12.

The support entity 32 may also include functionality for updating the ARS detection and repository system 38 and the support repository 42. For example, a troubleshooter may wish to request new diagnostic data from the node 12, or may identify a previously unknown risk factor, or may provide a new solution in view of a given risk assessment. Accordingly, the support entity 32 may be provided with a troubleshooting portal 48 for allowing the support entity 32 to be dynamically updated.

The troubleshooting portal 48 may include an authentication module 50 for identifying and authorizing a troubleshooter device 46 and/or a troubleshooting user. Upon being authenticated, the troubleshooter may interact with a data request module 52 to specify which types of diagnostic information the node 12 should provide to the support entity 32. Furthermore, the troubleshooter may interact with a troubleshooting module 54 to specify how the diagnostic information should flag certain risk assessments (e.g., by specifying threshold values for diagnostic parameters that, if exceeded, would identify a risk of failure), and to provide recommendations for remedial actions that may be taken in order to alleviate the risk condition.

Using the system depicted in FIG. 2, an ARS may be provided with risk assessments, and the support entity may be dynamically updated as new risks are identified. Exemplary procedures for requesting and providing risk assessments, and for dynamically updating the support entity, are next described with reference to FIGS. 3-7B.

Exemplary Techniques

Figure 3:
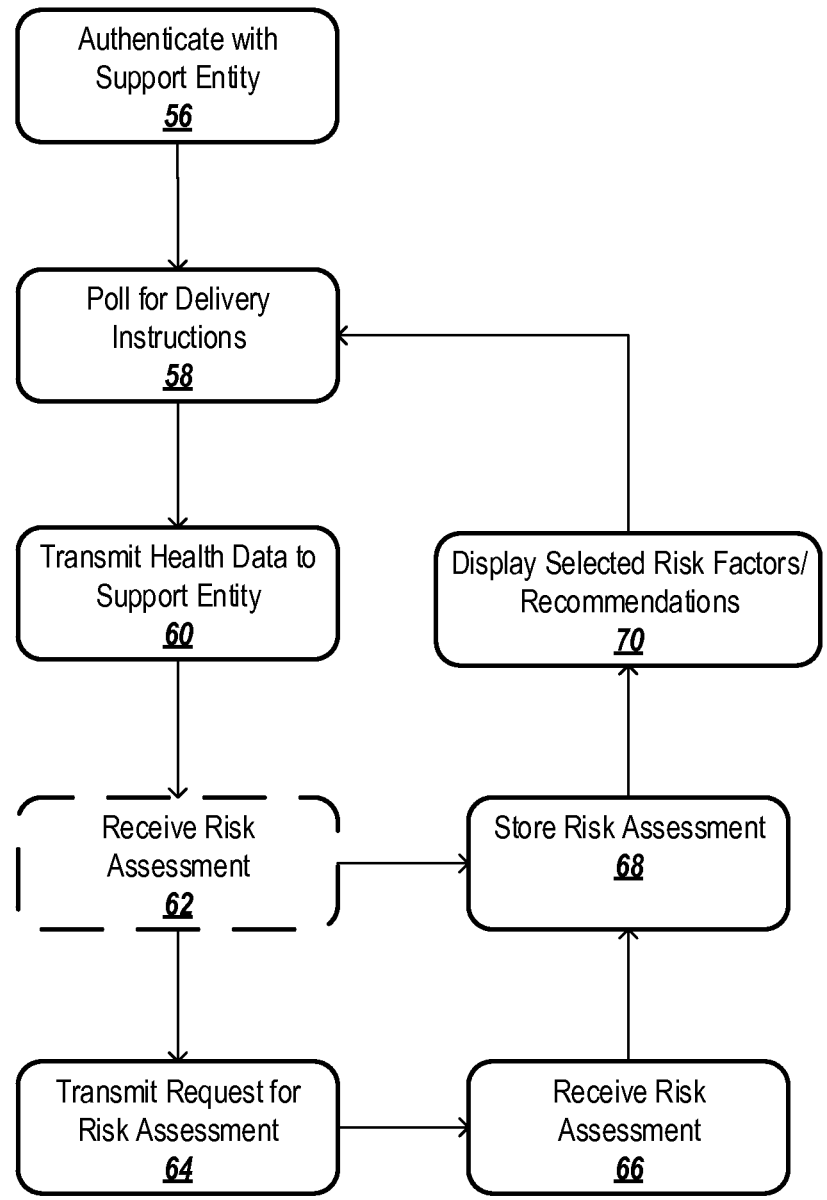
FIG. 3 depicts an exemplary method for generating and requesting a risk assessment from the perspective of a node device.

FIG. 3 depicts an exemplary method for generating and requesting a risk assessment from the perspective of a node device.

At step 56, the node device may authenticate with the support entity. For example, the node device may provide credentials to the support entity indicating that the node device is authorized to use the services of the node device. The node device may also provide information confirming the identity of the node device, so that the support entity may verify that the diagnostic information being provided is genuinely coming from the appropriate node device.

At step 58, the node device may poll the support entity for delivery instructions. The delivery instructions may indicate which parameters the support entity requests from the node device. The parameters may be used by the support device in performing risk assessments, and the parameters may be updated occasionally as new risk assessments are developed. Accordingly, polling for delivery instructions may be an ongoing process. If no delivery instructions are provided at step 58, the node device may continue to provide the parameters that had been previously requested by the support entity, or (if no parameters have been previously requested) may provide a default list of parameters.

For example, the parameters could include hardware configurations (which could indicate the presence of incompatible hardware types), available storage space (which could indicate the possibility of a disk write failure), and network access metrics (which could indicate the possibility of a communications failure). Some examples of values which may be monitored include temperature, utilization, interface configuration, redundancy, fan and power supply operation, and network connectivity.

At step 60, the node device may retrieve values for the parameters identified at step 58 and may transmit the values to the support entity. Step 60 may be performed in a number of circumstances. For example, step 60 may be performed automatically, at predefined intervals or times, or may be performed in response to an event (e.g., in response to a system crash or in response to a parameter falling below or rising above a predefined threshold). In some embodiments, transmission of the parameters may be triggered manually (e.g., by a user interacting with the system manager 28, or by technical support staff).

Optionally, at step 62 the node may automatically receive a new risk assessment in response to the data transmitted at step 60. Alternatively or in addition, a risk assessment may be manually requested at any time by transmitting a request for a risk assessment at step 64, and receiving the requested risk assessment at step 66.

Regardless of whether the risk assessment is manually or automatically transmitted, at step 68 the risk assessment may be stored locally at the node. The risk assessment may be stored in a predefined location in memory that has been designated for risk assessments.

At step 70, the node may identify any factors in the risk assessment indicative of an increased level of risk, and may display the identified factors. The factors from the risk assessment may be displayed on a native interface of the node, such as an interface of the system manager 28. The risk factors may be integrated into the node's existing interface, rather than requiring that a separate process be started or a new interface element be displayed for presenting the risk factors. In the same manner, if recommendations were transmitted with the risk assessment, the recommendations may also be stored at step 68 and displayed at step 70.

If a solution or recommendation includes data or code that may be automatically applied in an attempt to address one or more problems of the risk assessment, then the solution or recommendation may be automatically carried out at this stage.

Processing may then return to step 58, and the node may continue polling to determine whether any new delivery instructions have been provided by the support entity.

Figure 4:
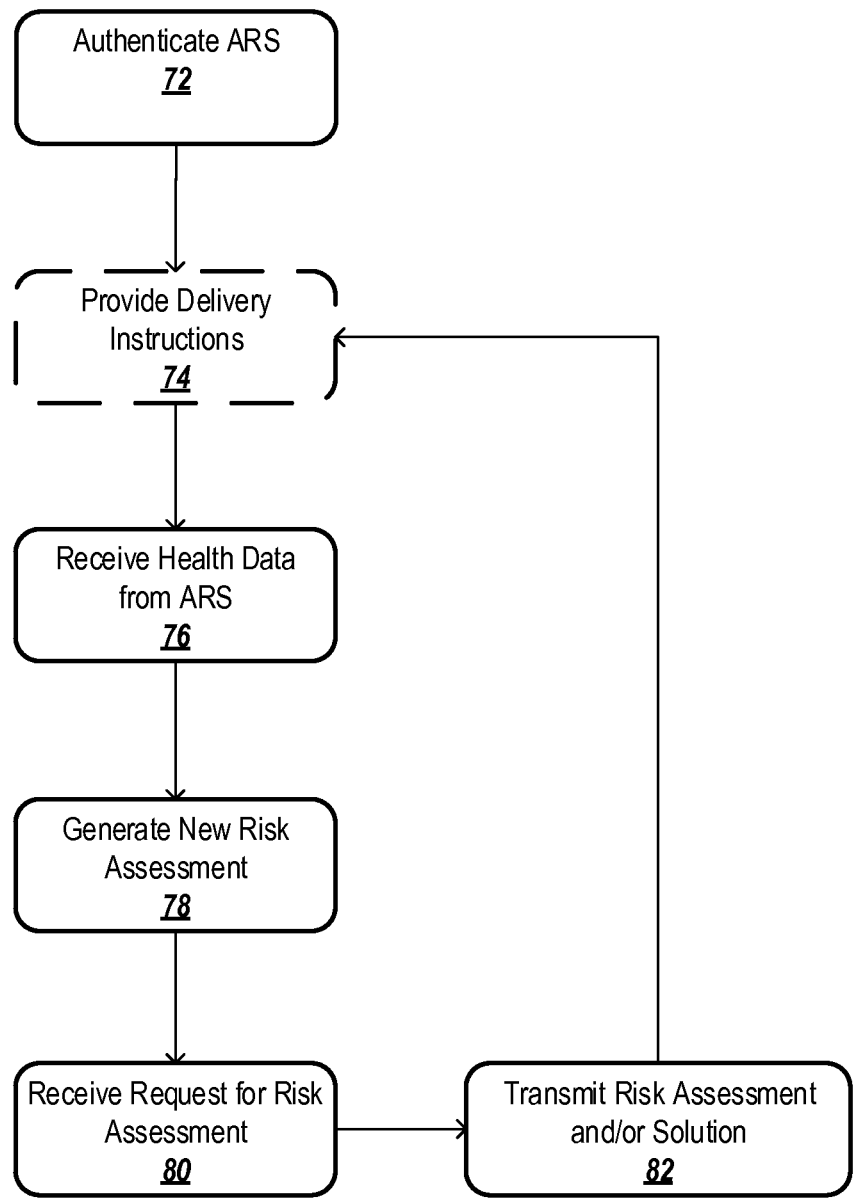
FIG. 4 depicts an exemplary method for generating and providing a risk assessment from the perspective of a support entity.

Next, FIG. 4 depicts an exemplary method for generating and providing a risk assessment from the perspective of a support entity.

At step 72, the support entity may authenticate a node requesting the services of the support entity. For example, the support entity may verify the node's credentials and may check the node against a list of authorized devices that have been approve to use the support entity.

Assuming that the node is authenticated, at step 74 the support entity may optionally provide any new delivery instructions indicating parameters requested from the node, if any such delivery instructions have been specified.

At step 76, the support entity may receive health data in the form of parameters from the node. The parameters may be provided to the support gateway of the support entity and then forwarded to the ARS detection and repository system for analysis. Upon storing new data in the ARS repository, the ARS repository may generate a notification informing the ARS module that new data is awaiting analysis.

In response, at step 78, the ARS module may generate a new risk assessment on the basis of the parameters received at step 76. The support entity may apply one or more predefined health monitors to the received parameters. Each health monitor may include one or more alerts that the health monitor can potentially raise, and one or more health policies that identify when each alert is triggered. The alerts may have a definition, which may include details such as the severity of the alert and its probable cause. The health policies may have a rule expression, which may include a condition or change that triggers the alert.

The health monitor may be applied to the received parameters to monitor and validate the parameters for condition or state changes. When a condition or state change matches a rule expression in a health policy, the health monitor may raise an alert. An alert may cause the node's health status and/or a health status of one or more node subsystems to become degraded.

Alerts may have one of a number of severities. For example, an alert may be of critical status, indicating the presence of a critical condition, of error status, indicating a problem that does not rise to the level of critical status, of warning status, indicating an abnormal condition of low priority, of notice status, indicating a normal but significant condition, of informational status, indicating that information is being provided about the parameter, or of debug status, indicating that the alert provides debug-level messages.

Upon generating the risk assessment, the support entity may optionally check the support repository to determine if any proposed solutions to alerts raised in the risk assessment have been suggested.

In response to generating the risk assessment, the support entity may automatically transmit the risk assessment back to the node that provided the parameters at step 76. Alternatively or in addition, at step 80 the support entity may receive a manual request for the risk assessment, and may respond at step 82 by transmitting the risk assessment to the node. If any solutions were identified at step 78, the support entity may transmit the proposed solutions to the node as well.

Figure 5:
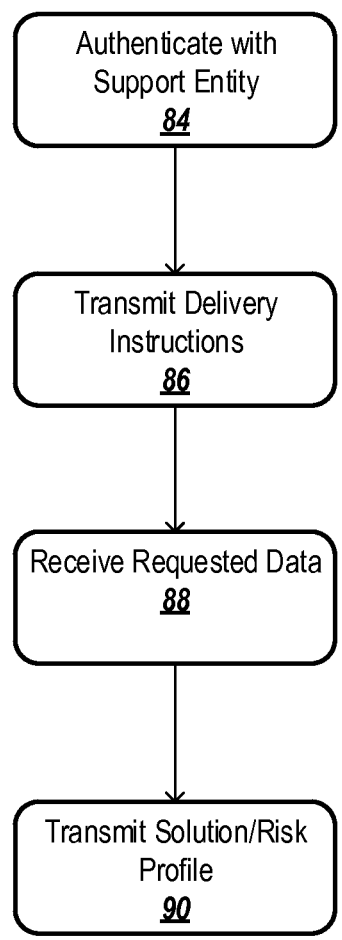
FIG. 5 depicts an exemplary method for requesting new information from a node device from the perspective of a troubleshooting device.
Figures 6A, 6B:
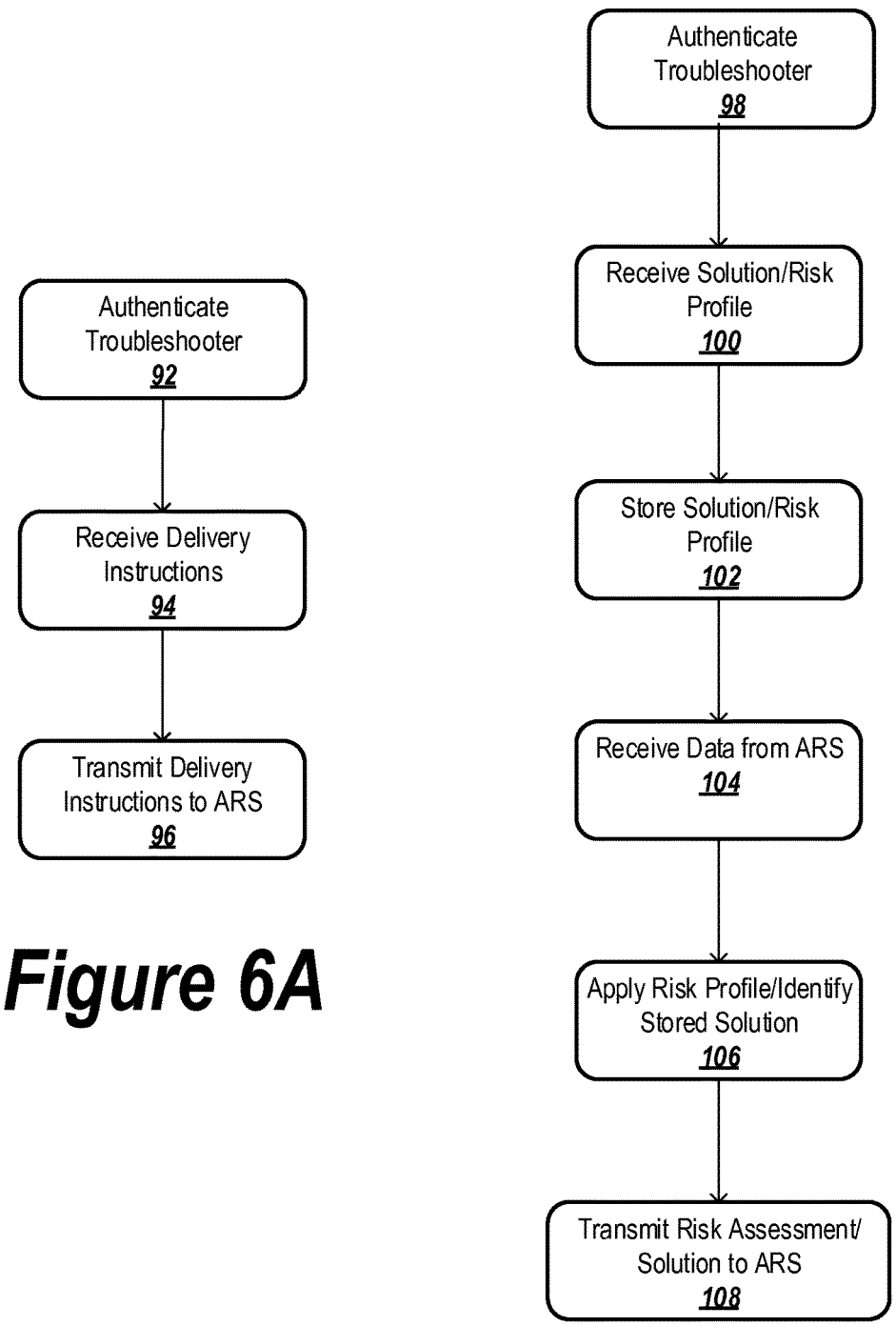
FIGS. 6A-6B depict exemplary methods for generating new or improved solutions from the perspective of a support entity.

Next, FIGS. 5-6B describe exemplary techniques for updating the support entity with requests for new parameters, new health monitors, and new proposed solutions.

FIG. 5 depicts an exemplary method for requesting new information from a node device from the perspective of a troubleshooting device.

At step 84, the troubleshooting device and/or a troubleshooting user may authenticate with the support entity. The support entity may verify that the troubleshooting device and/or user are authorized to provide new proposed solutions or risk assessments, and to request data from node devices.

At step 86, the troubleshooting user may transmit new delivery instructions to the data request module of the support entity. The delivery instructions may specify one or more new parameters to be requested from the node device the next time the node device polls for new delivery instructions.

The next time the node device provides parameter data for the parameters requested at step 86, the troubleshooter device may receive the requested data from the support entity (step 88). Using the requested data, the troubleshooting user may develop a new risk assessment or a new proposed solution or recommendation. Accordingly, at step 90 the troubleshooting user may generate a risk profile or a solution and transmit the profile or solution to the support entity.

FIGS. 6A-6B next depict exemplary methods for generating new or improved solutions from the perspective of a support entity.

FIG. 6A provides an exemplary technique for updating the delivery instructions at a node device. After authentication (step 92), at step 94, the support entity may receive new delivery instructions from the troubleshooting device via the data request module. The support entity may update the ARS module so that the ARS module stores the new requested parameters as the parameters are received from the node device. At step 96, the support entity may transmit the delivery instructions to the node device, for example in response to a polling request.

FIG. 6B provides an exemplary technique for updating and applying a new risk assessment or solution. After authentication (step 98), the support entity may receive new solutions or risk assessments from the troubleshooting device via the troubleshooting module. The support entity may update the ARS module so that the ARS module applies the new risk assessment the next time data is received from the node device (or the next time a risk assessment is otherwise requested). The support entity may also update the support repository so that the support repository stores and applies the new solutions and recommendations.

At step 104, new data may be received from the node device, and at step 106 the newly stored risk assessment and/or solution may be applied to the new data. Upon triggering an alert with the risk assessment or identifying an applicable solution, the risk assessment or solution may be transmitted to the node device at step 108.

Figure 7A:
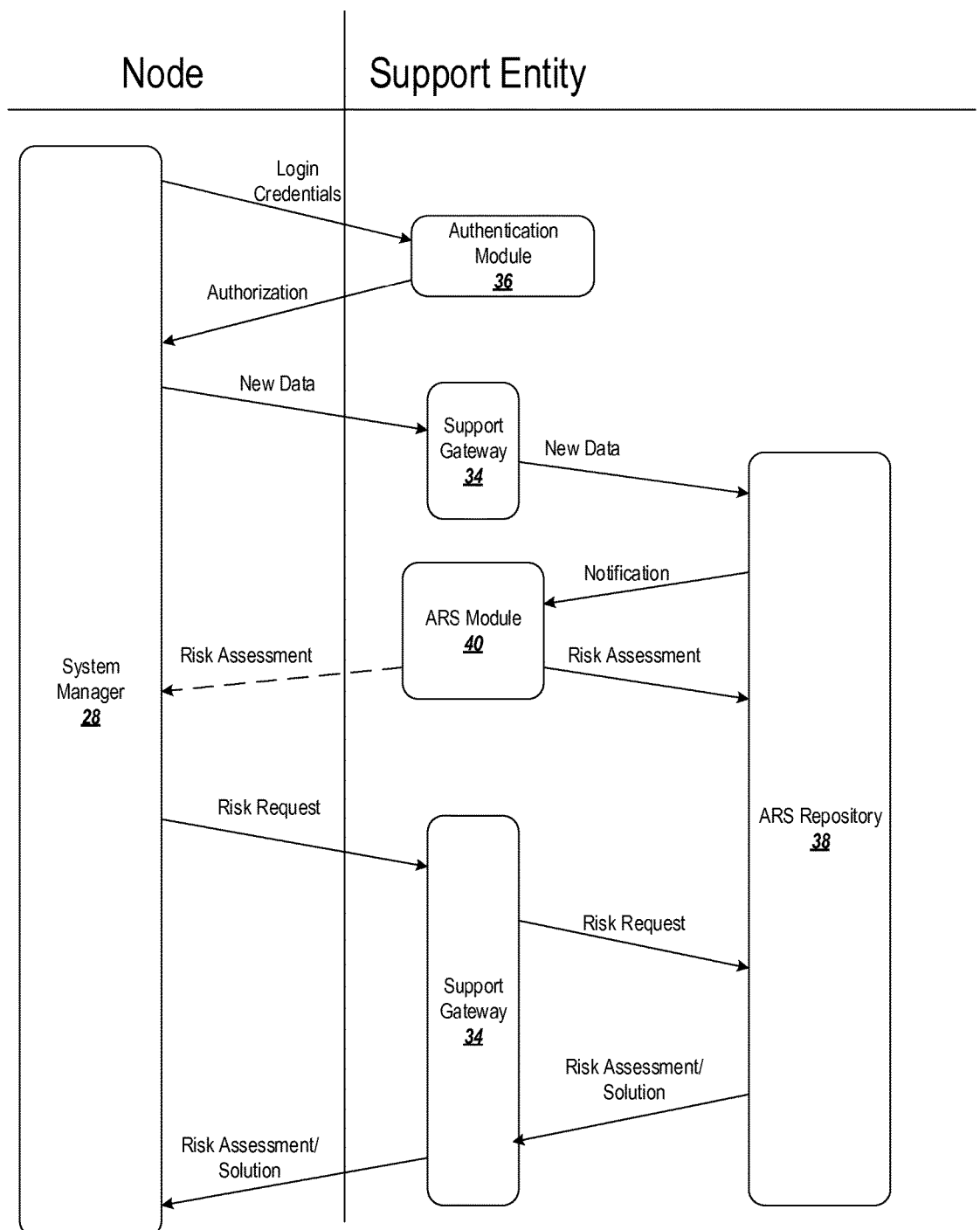
FIG. 7A depicts communications in an exemplary embodiment for creating and providing a risk assessment and/or support solution.
Figure 7B:
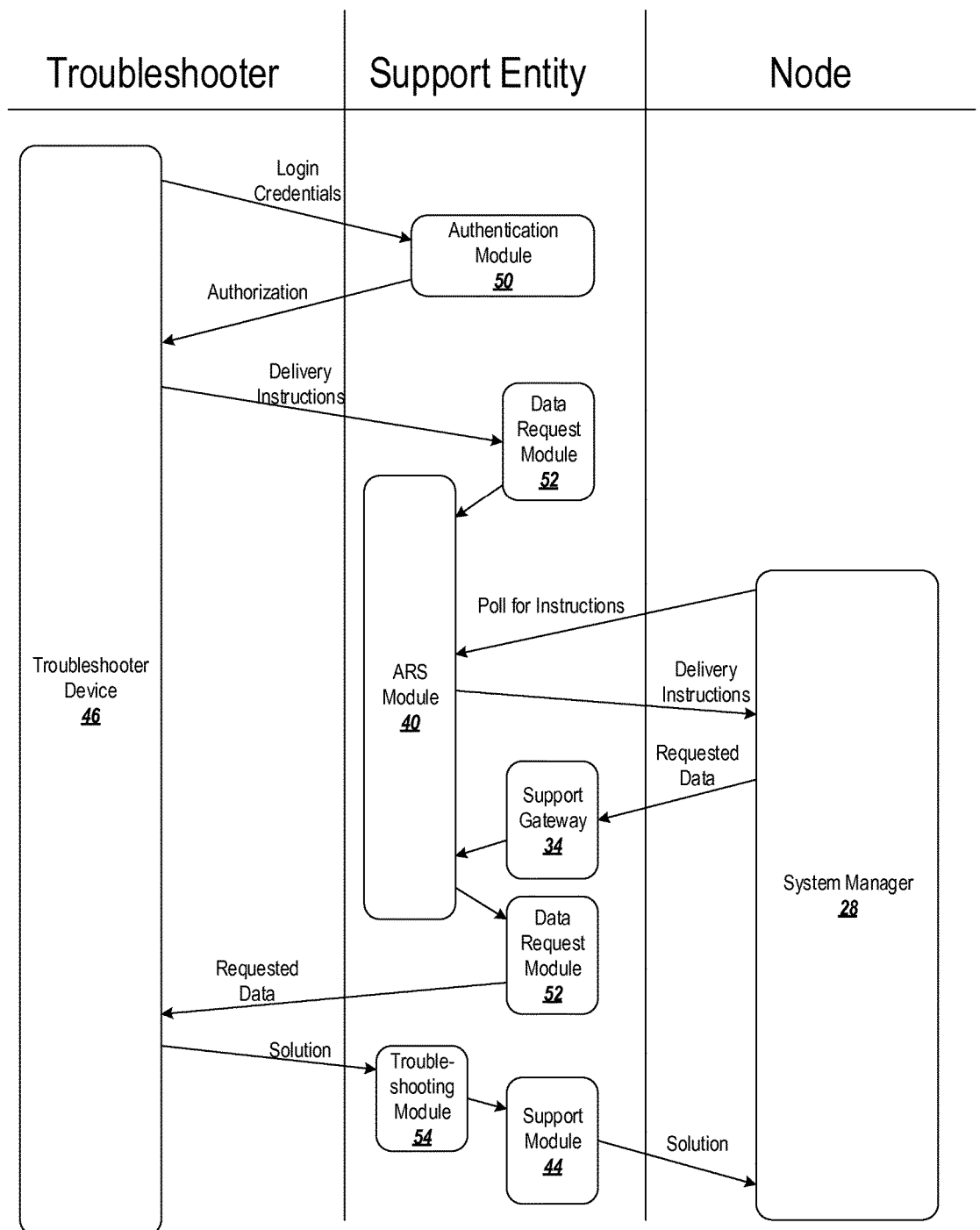
FIG. 7B depicts communications in an exemplary embodiment for providing new or improved solutions to support problems.

FIGS. 7A and 7B depict exemplary communications that occur in connection with the above-described embodiments. FIG. 7A depicts an exemplary embodiment for creating and providing a risk assessment and/or support solution, corresponding to FIGS. 3-4, while FIG. 7B depicts an exemplary embodiment for providing new or improved solutions to support problems, corresponding to FIGS. 5-6B.

Exemplary systems suitable for use with the above-described techniques are next described with reference to FIGS. 8-9.

Computer-Related Embodiments

The above-described methods may be embodied as instructions on a computer readable medium or as part of a computing architecture. FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

Figure 8:
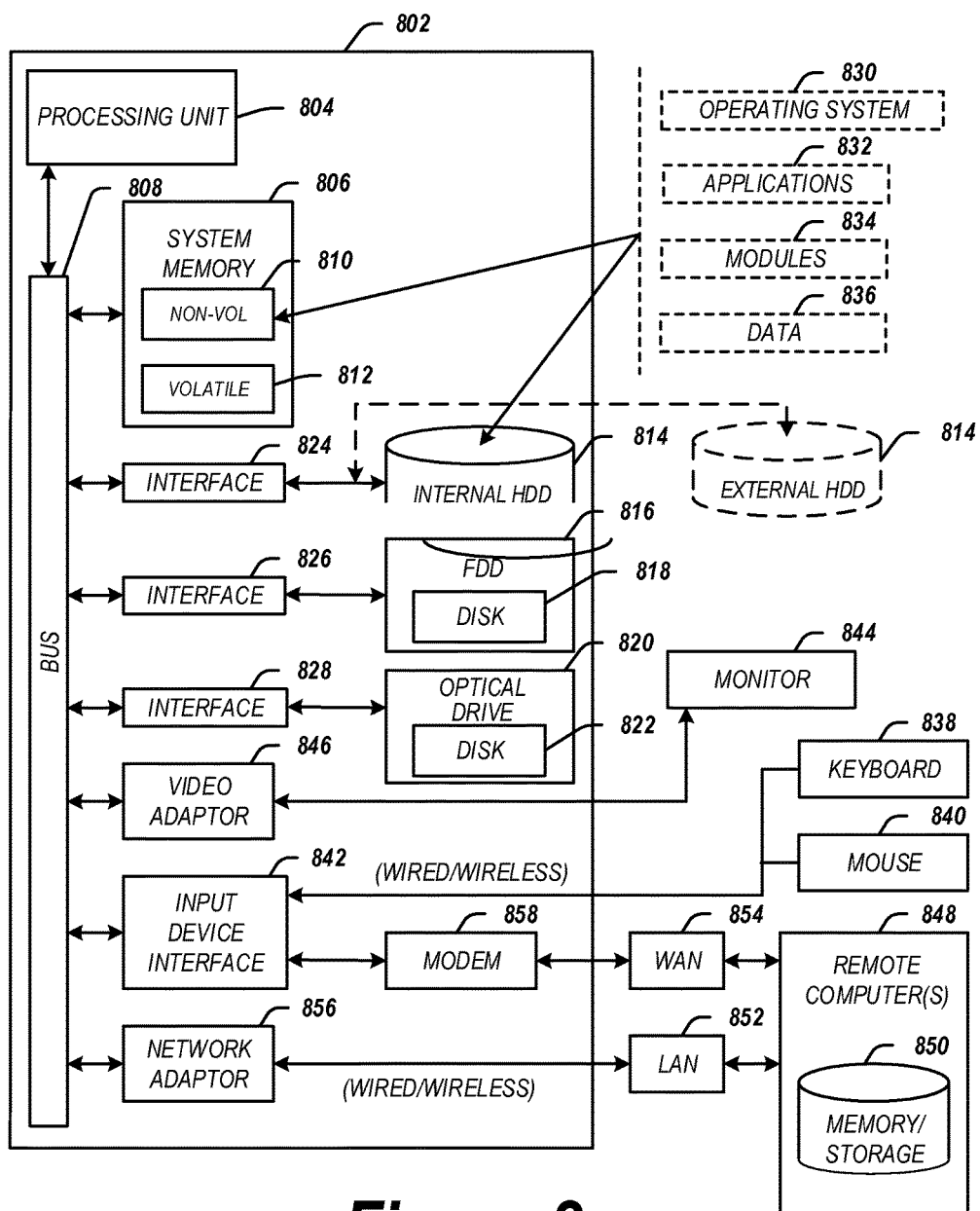
FIG. 8 depicts an exemplary computing device suitable for use with exemplary embodiments.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 30.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 842 that is coupled to the system bus 808, but can be connected by other interfaces such as a parallel port, IEEE 694 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
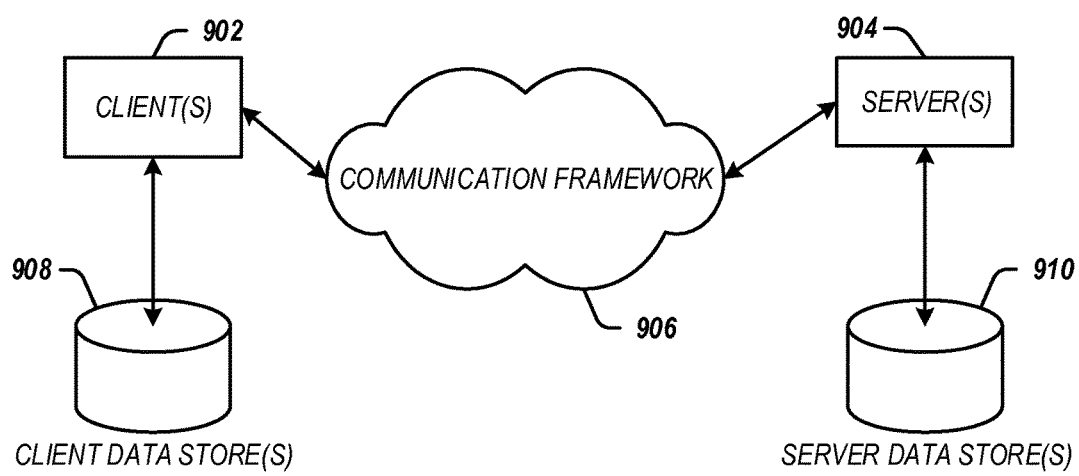
FIG. 9 depicts an exemplary network environment suitable for use with exemplary embodiments.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the client device 14 shown in FIG. 1. The servers 604 may implement the server device 104 shown in FIG. 1A. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus comprising:
a processor component of a device;
a communication interface of the device to communicatively couple the processor component to a network, the communication interface to receive health data from a node device in a cluster, the health data including one or more parameters indicative of a chance of failure of a component of the node device providing storage services in a networked storage cluster;
an at-risk system component to retrieve a rule from an at-risk system repository to generate a risk assessment based on the rule, the risk assessment comprising a health monitor and a health alert, and to apply the received health data to retrieved health monitor to generate the health alert;
a support repository for evaluating the risk assessment using a pre-defined rule for the risk assessment and selecting a solution pertaining to the risk assessment;
wherein the at-risk system repository and the support repository are updated based on new health data from the node device for identifying a new risk factor and for providing a new solution for the risk assessment; and
wherein the communication interface is further configured to transmit information specified by the health alert to the node device and wherein the risk assessment is presented in a native interface of the node device.

2. The apparatus of claim 1, wherein the communication interface is further configured to transmit delivery instructions to the node device, the delivery instructions specifying one or more new parameters requested of the node device.

3. The apparatus of claim 2, wherein the communication interface is further configured to transmit the delivery instructions in response to polling from the node device.

4. The apparatus of claim 1, wherein the support repository stores solution information pertaining to the risk assessment.

5. The apparatus of claim 4, wherein a support component is configured to retrieve a solution from the support repository based on the generated health alert, and the communication interface is further to transmit the retrieved solution to the node device.

6. The apparatus of claim 1, wherein the at-risk system repository is dynamically updatable via a troubleshooting portal.

7. A non-transitory computer-readable mediums storing logic that, when executed by a processor, causes the processor to:
generate health data indicative of a possibility of a failure of a node device or a subsystem of the node device providing storage services in a networked storage system;
transmit the health data to a support entity;
retrieve a rule by the support entity for generating a risk assessment associated with health data;
identify by the support entity, a solution for the risk assessment using a pre-defined rule;
receive, from the support entity, the risk assessment in response to the health data;
store the risk assessment in a memory of the node device;
display the risk assessment in a native interface of the node device; and
update the solution for the risk assessment and identify a new risk factor using new health data from the node device.

8. The medium of claim 7, further storing logic to display an interface for a system manager for configuring the node device, wherein displaying the risk assessment comprises updating the interface of the system manager to display one or more risk factors of the risk assessment.

9. The medium of claim 7, further storing logic to receive one or more recommendations for alleviating a problem condition indicated by the risk assessment.

10. The medium of claim 9, further storing logic to display the one or more recommendations in the native interface of the node device.

11. The medium of claim 7, further storing logic to periodically poll the support entity for delivery instructions indicating new parameters requested by the support entity.

12. The medium of claim 7, wherein the risk assessment is received automatically from the support entity after transmitting the health data.

13. The medium of claim 7, further storing logic to apply one or more solutions received from the support entity in response to the risk assessment.

14. A computer-implemented method comprising:
providing a support gateway configured to receive parameters from a node device indicative of a health of the node device, and configured to transmit a risk assessment to the node device on the basis of an analysis of the parameters; wherein the risk assessment is presented by the node device at a native interface of the node device; and wherein a rule is used to identify the risk assessment and another pre-defined rule identifies a solution for the risk assessment;
providing a troubleshooting portal configured to receive an updated list of parameters and an updated risk assessment; and
providing an at-risk system module configured to update an at-risk repository to accept the updated list of parameters and to apply the updated risk assessment to the updated list of parameters; wherein the updated risk assessment identifies one or more of a new risk factor and a new solution for the risk assessment.

15. The method of claim 14, comprising transmitting the updated list of parameters to the node device.

16. The method of claim 15, comprising running the updated risk assessment on data received from the node device in response to transmitting the updated list of parameters.

17. The method of claim 14, comprising providing a troubleshooting module for receiving one or more solutions or recommendations for responding to the updated risk assessment.

18. The method of claim 17, comprising providing a support module configured to update a support repository with the one or more solutions or recommendations.

19. The method of claim 14, wherein the support gateway is further configured to provide the updated list of parameters to the node device in response to polling from the node device.

20. The method of claim 14, wherein the updated risk assessment comprises a health monitor having a health policy that defines when a health alert is raised.

* * * * *